US012629711B1

(12) United States Patent
Liang et al.

(10) Patent No.: US 12,629,711 B1
(45) Date of Patent: May 19, 2026

(54) SPRAY DEVICE AND FAN

(71) Applicant: FOSHAN SHUNDE POYU HARDWARE PLASTIC CO., LTD., Foshan City (CN)

(72) Inventors: Weixiang Liang, Foshan City (CN); Sangen Liang, Foshan City (CN)

(73) Assignee: FOSHAN SHUNDE POYU HARDWARE PLASTIC CO., LTD., Foshan City (CN)

( * ) Notice: Subject to any disclaimer, the term of this patent is extended or adjusted under 35 U.S.C. 154(b) by 0 days.

(21) Appl. No.: 19/387,642

(22) Filed: Nov. 13, 2025

(30) Foreign Application Priority Data

| | | |
|---|---|---|
| Apr. 30, 2025 | (CN) | 202520867444.9 |
| Apr. 30, 2025 | (CN) | 202520867471.6 |
| Apr. 30, 2025 | (CN) | 202520867502.8 |

(51) Int. Cl.

| | |
|---|---|
| ***B05B 15/60*** | (2018.01) |
| ***B05B 12/08*** | (2006.01) |
| ***B05B 14/00*** | (2018.01) |
| ***B05B 17/00*** | (2006.01) |
| ***F04D 19/00*** | (2006.01) |
| ***F04D 29/54*** | (2006.01) |

(52) U.S. Cl.
CPC ............ *B05B 15/60* (2018.02); *B05B 12/085* (2013.01); *B05B 14/00* (2018.02); *B05B 17/0646* (2013.01); *F04D 19/002* (2013.01); *F04D 29/541* (2013.01)

(58) Field of Classification Search
CPC ....... B05B 15/60; B05B 12/085; B05B 14/00; B05B 17/0646; F04D 19/002; F04D 29/541
See application file for complete search history.

(56) References Cited

U.S. PATENT DOCUMENTS 5,586,723 A * 12/1996 Chen .................. B05B 17/0646 239/102.2
2015/0069146 A1* 3/2015 Lowy .................. B05B 17/0646 239/102.2
2017/0304475 A1* 10/2017 Frische ..................... A61L 2/22

FOREIGN PATENT DOCUMENTS

WO WO-2020218097 A1 * 10/2020 ............ G01F 11/266

* cited by examiner

*Primary Examiner* — Qingzhang Zhou
(74) *Attorney, Agent, or Firm* — Li & Cai Intellectual Property Office

(57) ABSTRACT

A spray device and a fan relate to the technical field of heat dissipation and humidification. The spray device includes: an inner shell, an atomization assembly, a recirculation assembly, an outer shell, a sensing assembly, and a control assembly. The inner shell is provided with a hollow water storage chamber, a first spray through hole communicating with the water storage chamber is provided on one side of the inner shell, a water injection hole is provided on the other side of the inner shell, the water injection hole connects the water storage chamber with a water injection guide member, and the water injection guide member is configured to inject water into the water storage chamber. The atomization assembly is embedded in the first spray through hole and is configured to atomize liquid in the water storage chamber and spray the liquid out of the water storage chamber.

20 Claims, 10 Drawing Sheets

SPRAY DEVICE AND FAN

FIELD OF THE DISCLOSURE

The present invention relates to the technical field of heat dissipation and humidification, and in particular, to a spray device and a fan.

BACKGROUND OF THE DISCLOSURE

A spray fan is a device that integrates air supply and spraying by combining an ordinary electric fan with a spray device. A typical structure of the spray fan includes fan blades, a drive motor, a spray device, and a control circuit. The high-speed airflow generated by the fan can quickly disperse the water mist generated by the spray device, so that the water mist is evenly distributed in the air, thereby achieving humidification, cooling, or air purification effects. Compared with a single spray device, the spray fan demonstrates higher atomization efficiency and wider coverage, and is especially suitable for use in a hot environment or a crowded place.

However, a conventional spray fan requires the installation of a water inlet pipe and a water outlet pipe to fill an atomization assembly with water to prevent air resistance. In addition, some of atomized water droplets are in contact with the fan and are condensed into larger drops that accumulate and drip from a fan surface, resulting in water waste and affecting customer experience.

SUMMARY OF THE DISCLOSURE

The present invention aims to provide a spray device to address defects and shortcomings in an existing technology, and to resolve at least one of the foregoing technical problems. The spray device has the advantages of preventing the occurrence of air resistance and water waste, and improving user experience.

To achieve the foregoing objectives, the present invention provides a spray device, including:

an inner shell, where the inner shell is provided with a hollow water storage chamber, a first spray through hole communicating with the water storage chamber is provided on one side of the inner shell, a water injection hole is provided on the other side of the inner shell, the water injection hole connects the water storage chamber with a water injection guide member, and the water injection guide member is configured to inject water into the water storage chamber;

an atomization assembly, where the atomization assembly is embedded in the first spray through hole and is configured to atomize liquid in the water storage chamber and spray the liquid out of the water storage chamber;

a recirculation assembly, including a recirculation port provided at the bottom of the inner shell and a water return channel for connecting the recirculation port with the water storage chamber;

an outer shell, where the outer shell is sleeved on an outer side of the inner shell, the outer shell is provided with a second spray through hole communicating with two opposite sides of the outer shell and facing the atomization assembly, a water collection tank is provided at the bottom of the outer shell, and the recirculation port is located in the water collection tank;

a sensing assembly, where the sensing assembly is provided in the water storage chamber and is higher than the atomization assembly; and a control assembly, where the control assembly is connected to a signal of the sensing assembly and is configured to control the water injection guide member to inject the water into the water storage chamber and control the water injection guide member to stop injecting the water into the water storage chamber based on the signal of the sensing assembly.

Compared with the prior art, this application has the following advantages.

1. In the present invention, the sensing assembly is triggered when the water injection guide member injects the water into the water storage chamber and the water in the water storage chamber continues to rise, and the assembly is triggered to send a signal to the control assembly. The control assembly controls the water injection guide member to stop injecting the water into the water storage chamber. In this case, the atomization assembly atomizes the water and sprays the water out of the water storage chamber, to achieve the purpose of cooling and humidification. While the atomization assembly atomizes the water and gradually sprays the water out of the water storage chamber, the air pressure in the water storage chamber gradually decreases. Because the water return channel connects the recirculation port with the water storage chamber, the recirculation port sucks the water in the water collection tank back into the water storage chamber through the water return channel, to prevent water waste and improve user experience. Further, a time control module is integrated on the control assembly, the time control module starts timing when the water pump stops running, and sends a signal to the control assembly when the water pump stops running for forty-five to fifty-five seconds, and the control assembly controls the water pump to start running. By using the time control module, the water pump starts running again after stopping for forty-five to fifty-five seconds. Because the water return channel connects the recirculation port with the water storage chamber, air in the water storage chamber is squeezed out from the recirculation port when the water pump stores the water. This resolves the problem that a conventional atomization assembly requires both a water injection pipe and a water outlet pipe to complete water injection. There is no need for a water receiving container to collect water flowing out of the water outlet pipe, and automatic circulation control of the spray device can be achieved to ensure a stable control logic. In addition, the water level in the water storage chamber can be maintained within a reasonable range, to ensure that the atomization assembly continues to obtain sufficient liquid, thereby improving the uniformity and continuity of spray effects.

2. By setting a mounting groove in the middle of a fan body and installing a mounting plate, the spray device is modularly fixed to the fan body. In addition, a water injection insertion post in the water injection guide member is installed on the mounting plate, and one end of the water injection insertion post can be inserted into the water injection hole of the inner shell and the other end is in communication with the water injection pipe. A sealing rubber sleeve is provided in the water injection hole. The sealing rubber sleeve is configured to be in close contact with a hole wall of the water injection hole and an outer side wall of the water injection insertion post, to prevent the water in the water storage chamber from flowing out of the water injection hole. This can realize quick docking and assembly and disassembly of the spray device and the fan body, and ensure precise alignment and sealed connection of a water supply passage of the spray module. The mounting plate and the inner shell can be detachably connected to each other by using a first magnetic member and a second magnetic member, to realize quick assembly and disassembly of the mounting plate and the inner shell.

BRIEF DESCRIPTION OF THE DRAWINGS

To more clearly illustrate technical solutions in embodiments of the present invention or in the prior art, the following briefly introduces accompanying drawings required in the embodiments or the prior art. It is clear that the accompanying drawings in the following descriptions are only embodiments of the present invention, and a person of ordinary skill in the art may still derive other drawings from the accompanying drawings without creative efforts.

REFERENCE NUMERALS

Figure 1:
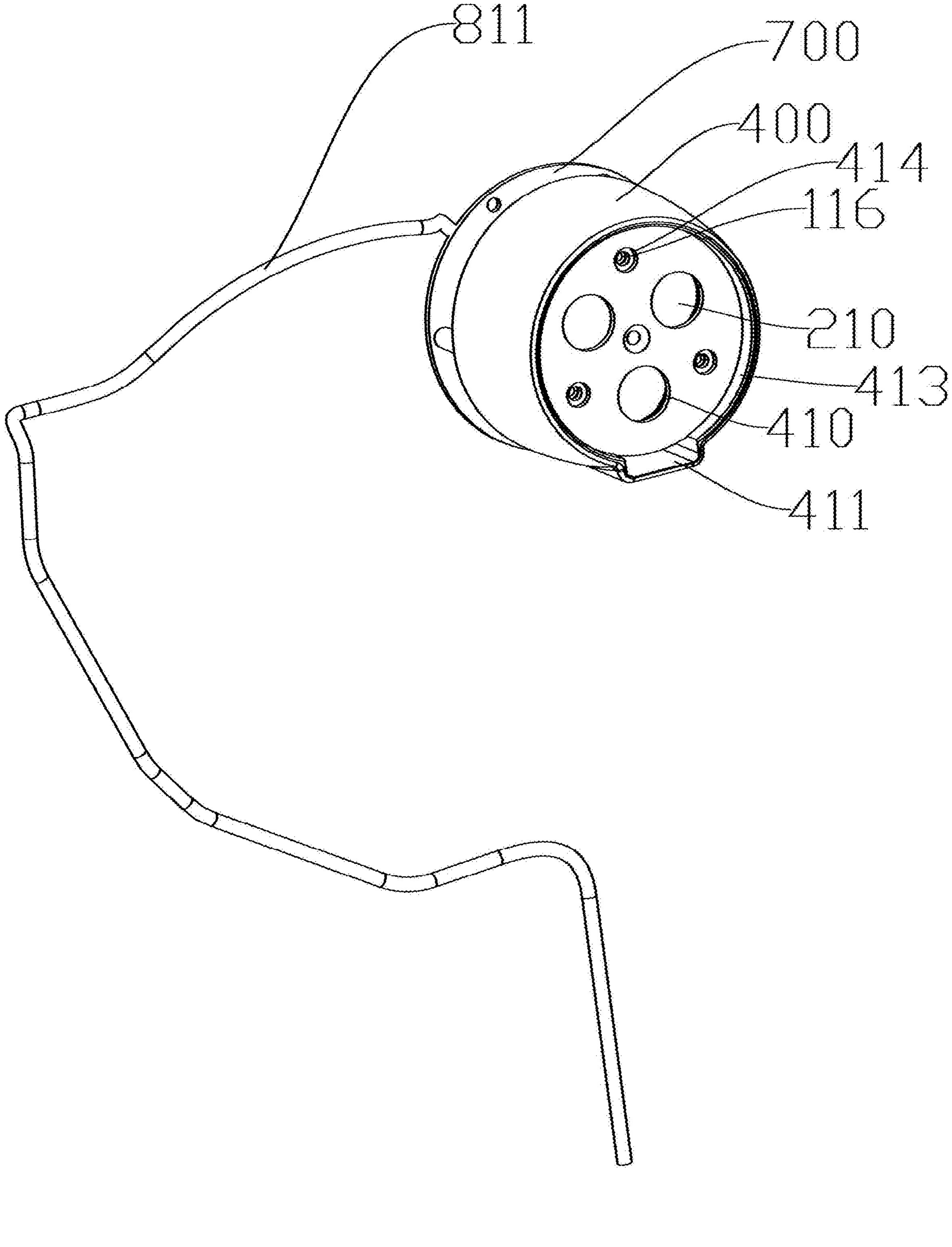
FIG. 1 is an axonometric diagram of a spray device according to the present invention.
Figure 2:
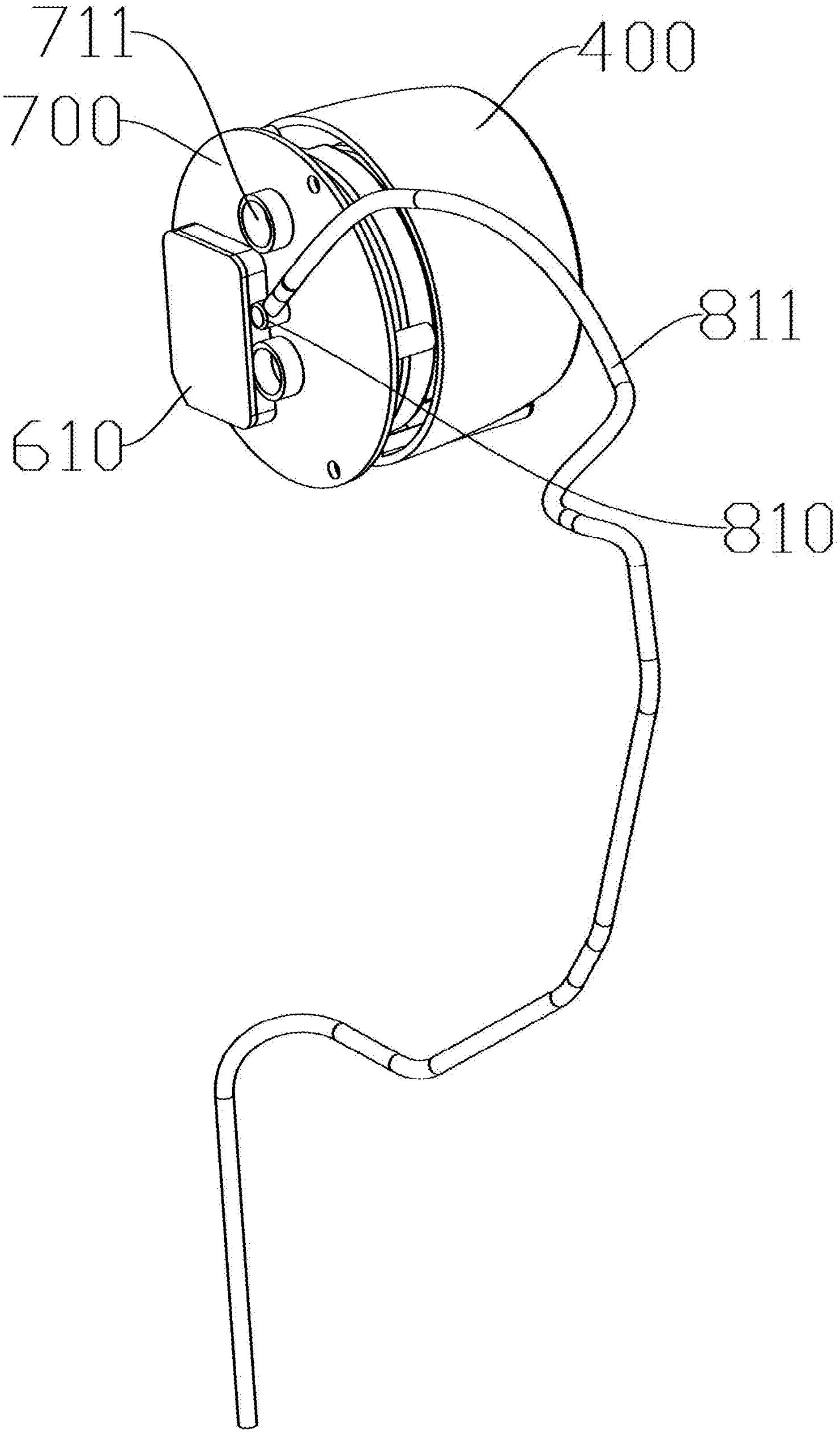
FIG. 2 is an axonometric diagram of a spray device from another angle according to the present invention.
Figure 3:
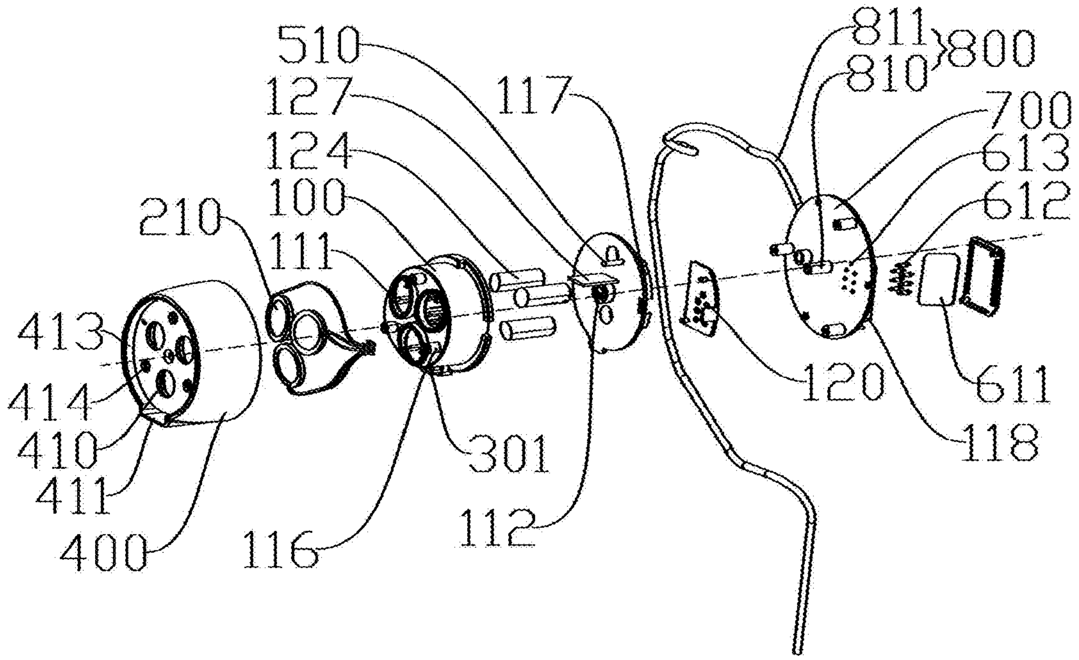
FIG. 3 is an exploded diagram of a spray device according to the present invention.
Figure 4:
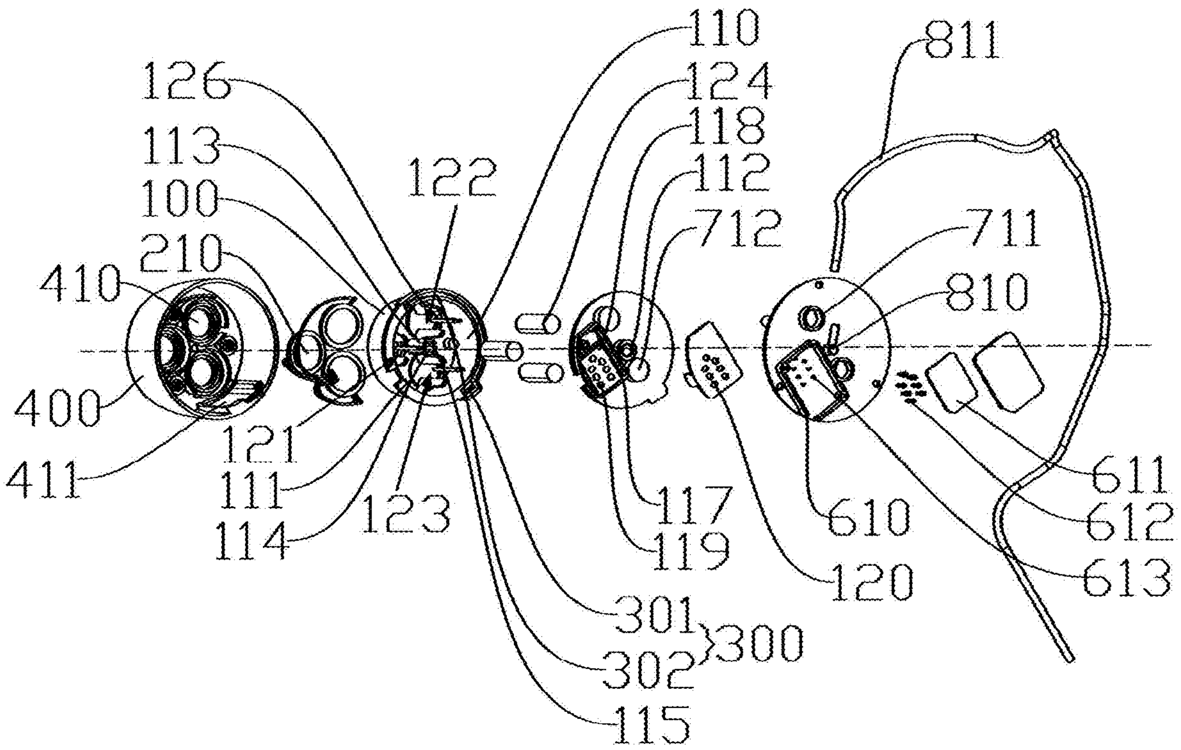
FIG. 4 is an exploded diagram of a spray device from another angle according to the present invention.
Figure 5:
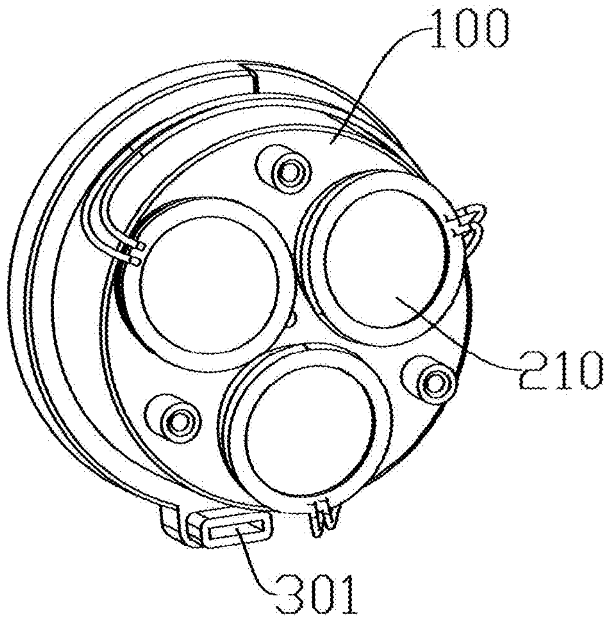
FIG. 5 is an axonometric diagram of an inner shell in a spray device according to the present invention.

100: inner shell; 110: water storage chamber; 111: first spray through hole; 112: water injection hole; 113: water guide protruding post; 114: water guide chamber; 115: water guide through groove; 116: first threaded connection post; 117: first box body; 118: first circuit board; 119: contact; 120: first avoidance hole; 121: first positioning base; 122: second positioning base; 123: third positioning base; 124: cylindrical sponge; 125: positioning plate; 126: water guide opening; 127: partition;

210: atomization sheet;

300: recirculation assembly; 301: recirculation port; 302: water return channel;

400: outer shell; 410: second spray through hole; 411: water collection tank; 413: annular guide portion; 414: first connection through hole;

510: sensing probe;

610: second box body; 611: second circuit board; 612: spring conductive contact pin; 613: second avoidance hole; 620: control circuit board;

700: mounting plate; 711: first magnetic member; 712: second magnetic member;

800: water injection guide member; 810: water injection insertion post; 811: water injection pipe; 820: water pump;

900: fan body; 911: grille; 912: connection plate; 913: guide limiting groove; 914: mounting groove;

1000: U-shaped base; 1011: guide limiting channel;

1100: accommodation shell; 1200: power supply body; 1300: charging port.

DETAILED DESCRIPTION OF THE EXEMPLARY EMBODIMENTS

The following clearly and completely describes the technical solutions in embodiments of the present invention with reference to the accompanying drawings in the embodiments of the present invention. It is clear that the described embodiments are merely some but not all of embodiments of the present invention. All other embodiments obtained by a person of ordinary skill in the art based on embodiments of the present invention without creative efforts shall fall within the protection scope of the present invention.

Refer to FIG. 1 to FIG. 12. Embodiments of the present invention provide a spray device, including: an inner shell 100, an atomization assembly, a recirculation assembly 300, an outer shell 400, a sensing assembly, and a control assembly. The inner shell 100 is provided with a hollow water storage chamber 110, a first spray through hole 111 communicating with the water storage chamber 110 is provided on one side of the inner shell 100, a water injection hole 112 is provided on the other side of the inner shell 100, the water injection hole 112 connects the water storage chamber 110 with a water injection guide member 800, and the water injection guide member 800 is configured to inject water into the water storage chamber 110. The atomization assembly is embedded in the first spray through hole 111 and is configured to atomize liquid in the water storage chamber 110 and spray the liquid out of the water storage chamber 110. The recirculation assembly 300 includes a recirculation port 301 provided at the bottom of the inner shell 100 and a water return channel 302 provided on a side wall of the inner shell 100 and configured to connect the recirculation port 301 with the water storage chamber 110, and the water return channel may alternatively be formed through an external pipe. The outer shell 400 is sleeved on an outer side of the inner shell 100, the outer shell 400 is provided with a second spray through hole 410 communicating with two opposite sides of the outer shell and facing the atomization assembly, a water collection tank 411 is provided at the bottom of the outer shell 400, and the recirculation port 301 is located in the water collection tank 411. The sensing assembly is provided in the water storage chamber 110 and is higher than the atomization assembly. Further, the water storage chamber 110 is configured to store to-be-atomized liquid, and the water injection hole 112 is configured to connect to the external water injection guide member 800 for water supply. The atomization assembly may specifically be embedded in the first spray through hole 111 by using a piezoelectric ceramic atomization sheet 210. The recirculation assembly 300 includes the recirculation port 301 provided at the bottom of the inner shell 100 and the water return channel 302 provided on the side wall of the inner shell or externally connected, configured to redirect the water in the water collection tank 411 into the water storage chamber 110. The second spray through hole 410 is provided opposite to the atomization assembly. The sensing assembly refers to a liquid level monitoring device, and can specifically be a voltage-type water level sensor for real-time detection of the liquid level height of the water storage chamber 110 and control of the stopping of the water injection guide member 800. The control assembly is electrically connected to the sensing assembly and is configured to control the water injection guide member 800 to inject the water into the water storage chamber 110 and control the water injection guide member 800 to stop injecting the water into the water storage chamber 110 based on the detection of the sensing assembly. According to core innovation of this application, the sensing assembly is triggered when the water injection guide member 800 injects the water into the water storage chamber 110 and the water in the water storage chamber 110 continues to rise, and the sensing assembly is triggered to trigger the control assembly to control the water injection guide member 800 to stop injecting the water into the water storage chamber 110. In this case, the atomization assembly atomizes the water and sprays the water out of the water storage chamber 110, to achieve the purpose of cooling and humidification. While the atomization assembly atomizes the water and gradually sprays the water out of the water storage chamber 110, the air pressure in the water storage chamber 110 gradually decreases. The recirculation port 301 sucks the water in the water collection tank 411 back into the water storage chamber 110 through the water return channel 302, to prevent water waste and improve user experience. Further, a time control module is integrated on the control assembly (not shown in the figure), the time control module starts timing when the water pump 820 stops running, and sends a signal to the control assembly when the water pump stops running for forty-five to fifty-five seconds, and the control assembly controls the water pump to start running. In this way, automatic circulation control of the spray device can be achieved to ensure a stable control logic. In addition, the water level in the water storage chamber 110 can be maintained within a reasonable range, to ensure that the atomization assembly continues to obtain sufficient liquid, and the control assembly is connected to the sensing assembly via a guide wire. The control assembly includes a control circuit board 620, the time control module is integrated on the control circuit board 620, and the control circuit board may be provided in the fan body.

Refer to FIG. 1 to FIG. 8. In this embodiment, a mounting plate 700 is included, and the mounting plate 700 is detachably connected to the inner shell 100 via a detachable connection assembly. Further, the detachable connection assembly includes a first magnetic member 711 provided on one side of the mounting plate 700 away from the inner shell 100 and a second magnetic member 712 that is provided on one side of the inner shell 100 close to the mounting plate 700 and that cooperates with the first magnetic member for attachment. Specifically, the mounting plate 700 is set, and the mounting plate 700 and the inner shell 100 are detachably connected by using the first magnetic member 711 and the second magnetic member 712, to realize quick assembly and disassembly of the mounting plate 700 and the inner shell 100. This is convenient for later maintenance, replacement, or cleaning. In some embodiments, the detachable connection assembly includes an insertion post provided on one side of the mounting plate 700 close to the inner shell 100 and an insertion hole provided on one side of the inner shell 100 close to the mounting plate 700. The mounting plate 700 and the inner shell 100 are detachably connected through the cooperation of the insertion post and the insertion hole. In some embodiments, a suction cup is provided on one side of the mounting plate away from the inner shell, and the mounting plate may be attached in the middle of a fan outlet surface by using the suction cup, to facilitate the connection of the spray device according to the present invention as a whole with the fan.

In this embodiment, the atomization assembly includes three atomization sheets 210, the three atomization sheets are correspondingly provided between the first spray through hole 111 and the second spray through hole 410, a first circuit board is provided on one side of the inner shell 100 away from the first spray through hole 111, and the atomization sheet 210 is electrically connected to the first circuit board. Further, the atomization sheet 210 may be made of piezoelectric ceramic, and a corresponding relationship between the atomization sheet 210 and the first spray through hole 111 and the second spray through hole 410 may form an independent atomization channel to ensure long-term operation stability.

In this embodiment, the control assembly includes a first box body 117 provided on one side of the inner shell 100 away from the first spray through hole 111, a first circuit board 118 is provided in the first box body 117, a plurality of contacts 119 are provided on the first circuit board 118, and a plurality of first avoidance holes 120 facing the contacts 119 are provided on the first box body 117. Further, a second box body 610 is provided on one side of the mounting plate 700 close to the inner shell 100, a second circuit board 611 is provided in the second box body 610, a plurality of spring conductive contact pins 612 are provided on the second circuit board 611, a plurality of second avoidance holes 613 for the spring conductive contact pins 612 to pass through are provided on the mounting plate 700, and the spring conductive contact pins 612 can pass through the second avoidance holes 613 and the first avoidance holes 120 and then contact and conduct with the contacts 119. Specifically, the first box body 117 is set on the inner shell 100 and the second box body 610 is set on the mounting plate 700, and the first circuit board 118 and the second circuit board 611 are electrically connected through a contact structure of the spring conductive contact pins 612 and the contacts 119, so that the electrical connection of the control assembly has a detachable feature, without the need to use a conventional welding wire or an insertion wire. The circuit can be automatically connected or disconnected when the inner shell 100 and the mounting plate 700 are assembled or disassembled, to greatly improve the convenience of assembly and maintenance. The spring conductive contact pins 612 ensure stable contact with the contacts 119 through elastic top pressure. The first avoidance holes and the second avoidance holes 613 are set to provide precise alignment guides for the contact pins and the contacts 119, so that automatic docking can be quickly completed during installation, to reduce the difficulty and the error rate of manual operation. The second circuit board 611 is electrically connected to the control circuit board.

In this embodiment, a first positioning base 121, a second positioning base 122, and a third positioning base 123 are provided in the water storage chamber 110; a cylindrical sponge 124 is provided in each of the first positioning base 121, the second positioning base 122, and the third positioning base 123; one end of the cylindrical sponge 124 is closely attached to the atomization sheet 210; the first positioning base 121 and the second positioning base 122 are provided in a horizontal direction; and the third positioning base 123 is provided below the first positioning base 121 and the second positioning base 122. Further, the cylindrical sponge 124 is set in each positioning base and one end of the cylindrical sponge is closely attached to the atomization sheet 210, so that the cylindrical sponge 124 always maintains a close fit with the atomization sheet 210, to ensure that the atomization sheet 210 can continuously and evenly absorb the water for atomization during operation.

In this embodiment, the first positioning base 121, the second positioning base 122, and the third positioning base 123 each include at least three positioning plates 125, the positioning plates 125 are provided with a water guide opening 126 passing through opposite sides of the positioning base, a clamping positioning space is formed between the three positioning plates 125, and the cylindrical sponge 124 is clamped in the clamping positioning space. Further, at least three positioning plates 125 with the penetrating water guide opening 126 are set in the first positioning base 121 and the second positioning base 122, the three positioning plates 125 are enclosed to form the clamping positioning space, and he cylindrical sponge 124 is clamped and fixed in the space. This can form a stable three-point surrounding limiting support for the sponge to prevent the sponge from loosening, tilting or falling off due to long-term immersion in water, expansion, contraction or equipment vibration, to ensure that the cylindrical sponge 124 is always close to the atomization sheet 210 for continuous water supply. The three positioning plates 125 are used to fix the cylindrical sponge 124, so that the water can maximize the contact with the cylindrical sponge 124 while maintaining the stability of the cylindrical sponge 124. The water guide opening 126 on the positioning plates 125 can allow the water to flow smoothly between the positioning plates 125, to prevent local uneven dryness and wetness caused by water retention.

In this embodiment, a water guide protruding post 113 is provided in the water storage chamber 110, a water guide chamber 114 is provided in the water guide protruding post 113, one end of the water guide chamber 114 is in communication with the water injection hole 112, a water guide through groove 115 that is in communication with the water guide chamber 114 is provided on an outer side wall of the water guide protruding post 113, one side of the first positioning base 121, the second positioning base 122, or the third positioning base 123 close to the water guide protruding post 113 is connected to the water guide protruding post 113 through the positioning plate 125. Further, the water guide protruding post 113 is provided in the water storage chamber 110, the water guide chamber 114 that is in communication with the water injection hole 112 is formed in the water storage chamber, and the water guide through groove 115 that is in communication with the water guide chamber 114 is provided on the outer wall of the water guide protruding post 113, so that the water injected from the outside can be quickly diverted along the water guide chamber 114 and evenly dispersed into the water storage chamber 110 through the water guide through groove 115. This helps achieve directional introduction and uniform distribution of the water. In addition, the first, second and third positioning bases 123 are fixed around the water guide protruding post 113 through the positioning plate 125, to construct a stable support skeleton with the water guide protruding post 113 as the center.

In this embodiment, a partition 127 is provided above the water guide protruding post 113. The partition 127 is provided between the water guide protruding post 113 and the sensing assembly, to prevent the water ejected from the water guide protruding post 113 from directly contacting the sensing assembly. Further, the partition 127 is provided above the water guide protruding post 113 and the partition is provided between the water guide protruding post 113 and the sensing assembly, so that the water ejected from the water guide protruding post 113 can be blocked from directly impacting the sensing assembly, to prevent the formation of splashing water droplets adhering to the surface of the sensing assembly and causing continuous false triggering.

In this embodiment, the water return channel 302 extends from the bottom of the inner shell 100 along the side wall of the inner shell 100 to the top of the inner shell 100. Further, the water return channel 302 extends from the bottom of the inner shell 100 along the side wall of the inner shell 100 to the top of the inner shell 100, so that the water flowing back from the water collection tank 411 can be smoothly introduced along the side wall to the top of the water storage chamber 110.

In this embodiment, an annular guide portion 413 is protruded from one end of the outer shell 400 away from the inner shell 100, the water collection tank 411 is in communication with the guide portion, and a connection hole for inserting the recirculation port 301 into the water collection tank 411 is provided on one end of the water collection tank 411. Further, the annular guide portion 413 is in communication with the water collection tank 411, and the connection hole for inserting the recirculation port 301 is provided at one end of the water collection tank 411, so that part of the water ejected from the atomization assembly can be guided by the annular guide portion 413 along the inner wall of the outer shell 400 and collected into the water collection tank 411. The connection hole allows the recirculation port 301 to be directly inserted into and sealed with the water collection tank 411, so that the accumulated water in the water collection tank 411 can be sucked back into the water storage chamber 110 through the water return channel 302, to prevent water waste.

In this embodiment, the sensing assembly is a sensing probe 510, and the sensing probe 510 is configured to sense a voltage change in the water storage chamber; and when the water in the water storage chamber is in contact with the sensing probe 510, the atomization sheet conducts with the sensing probe through the water, and the control assembly controls a water pump to stop running after detecting the change of the sensing probe 510. In this way, accurate real-time monitoring of the water level in the water storage chamber 110 and automatic pump stop control can be achieved to prevent the water storage chamber 110 from being overfilled with water. This liquid level detection based on voltage changes has a fast response speed, a simple structure, and low costs, and water injection can immediately be cut off when the liquid level rises to a set height.

In this embodiment, a plurality of first threaded connection posts 116 are provided on one side of the inner shell 100, a plurality of first connection through holes 414 corresponding to the first connection posts are provided on one side of the outer shell 400, the first connection posts and the first spray through holes 111 are located on the same side of the inner shell 100, and can be connected to the first threaded connection posts 116 after passing through the first connection through holes 414 by using screws. Further, the first connection posts and the first spray through holes can be connected to the first threaded connection posts 116 after passing through the first connection through holes 414 by using screws, to achieve a firm and detachable fixed connection between the inner shell 100 and the outer shell 400, and ensure that the two shells do not generate relative displacement, looseness or leakage during long-term use, vibration or moving, thereby improving overall structural stability of the spray device.

Figure 6:
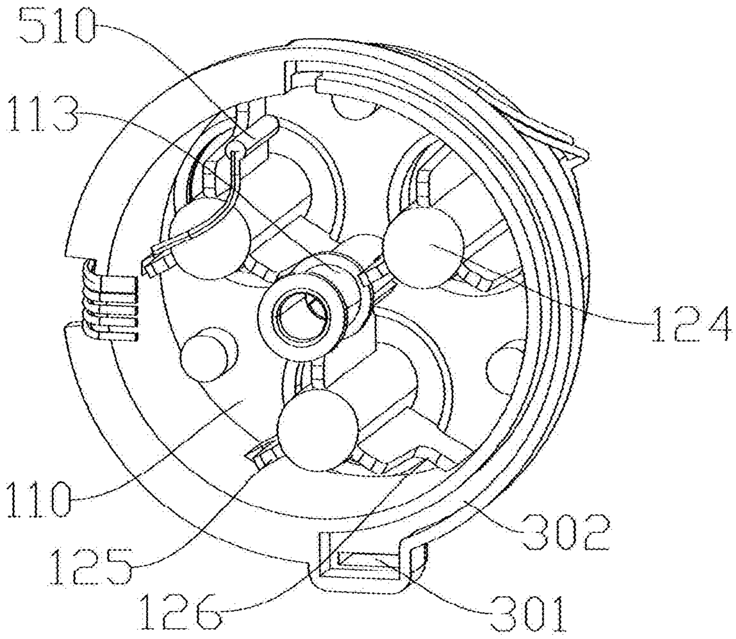
FIG. 6 is a diagram of an inner structure of an inner shell in a spray device according to the present invention.
Figure 7:
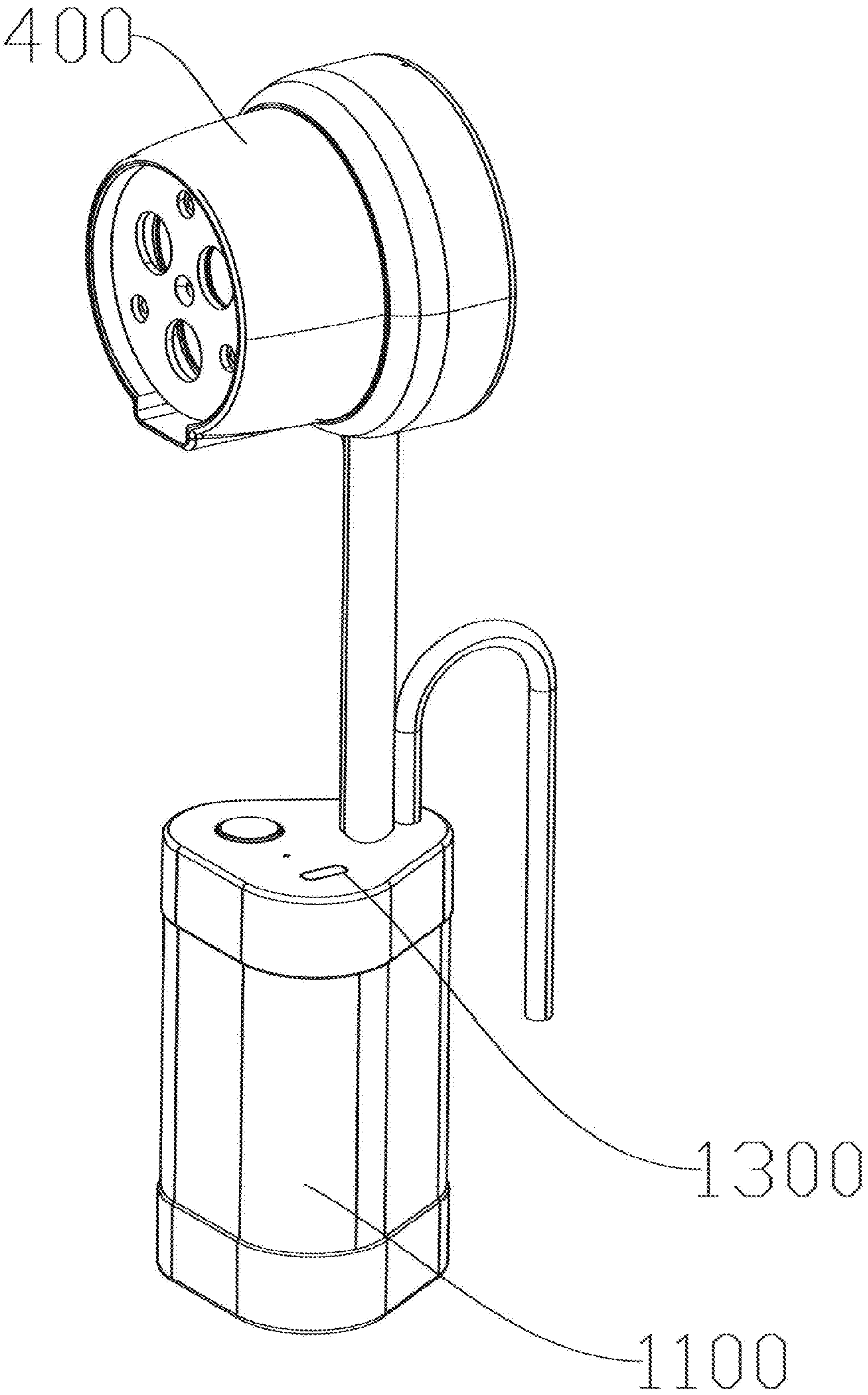
FIG. 7 is a diagram of a structure of an independent power supply main body and a spray device according to the present invention.
Figure 8:
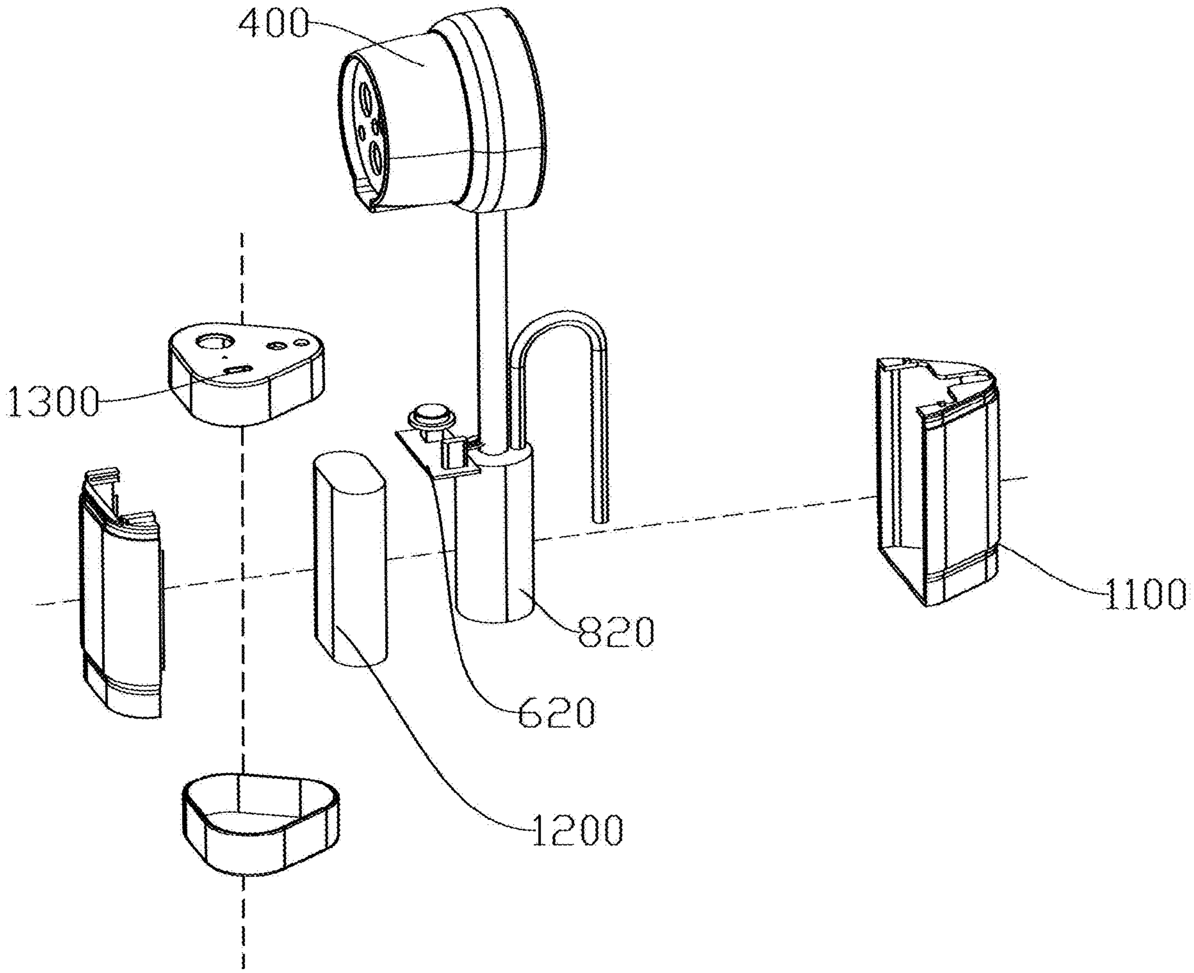
FIG. 8 is an exploded diagram of an independent power supply main body and a spray device according to the present invention.
Figure 9:
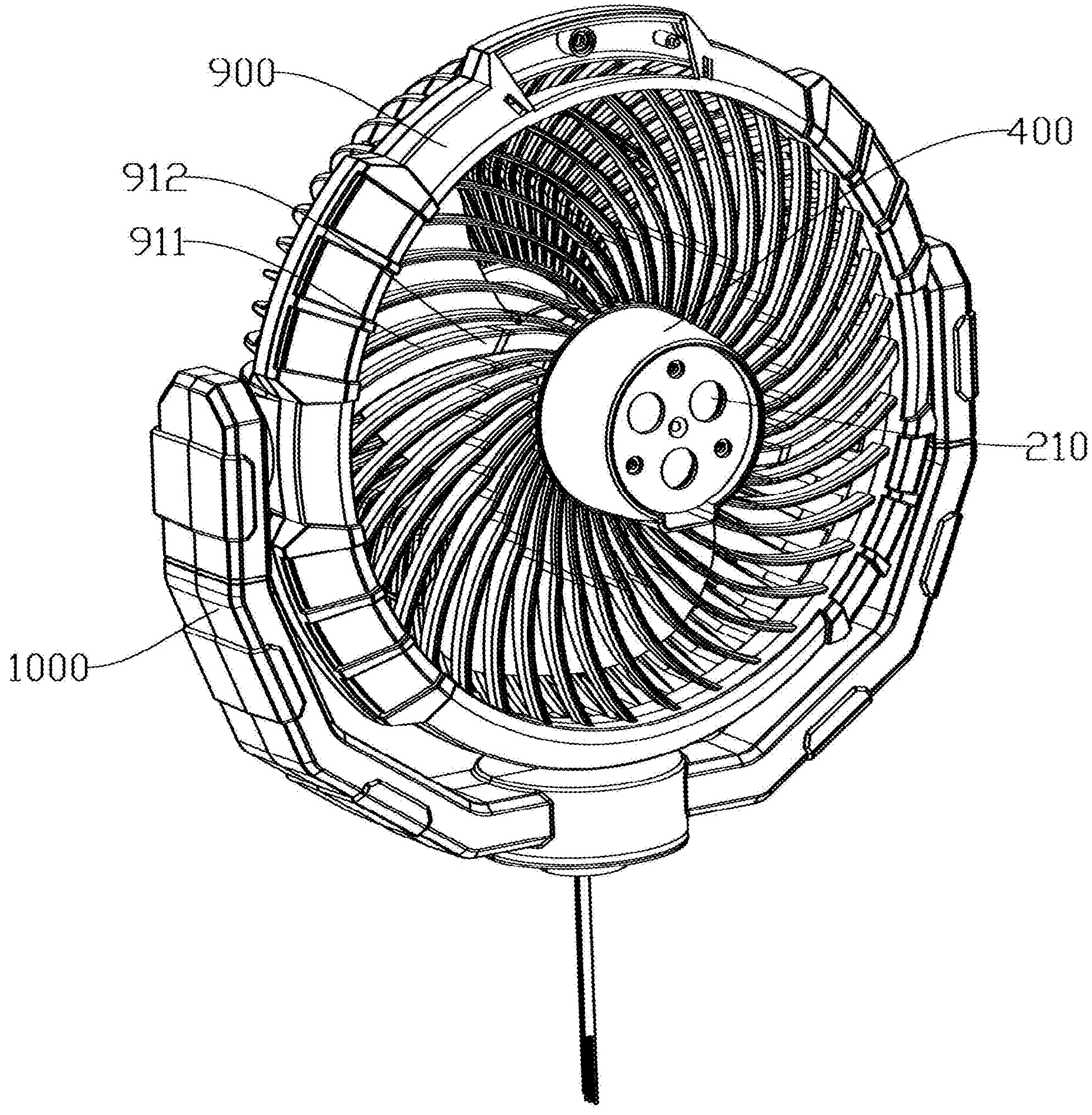
FIG. 9 is an axonometric diagram of a spray device cooperating with a fan according to the present invention.
Figure 10:
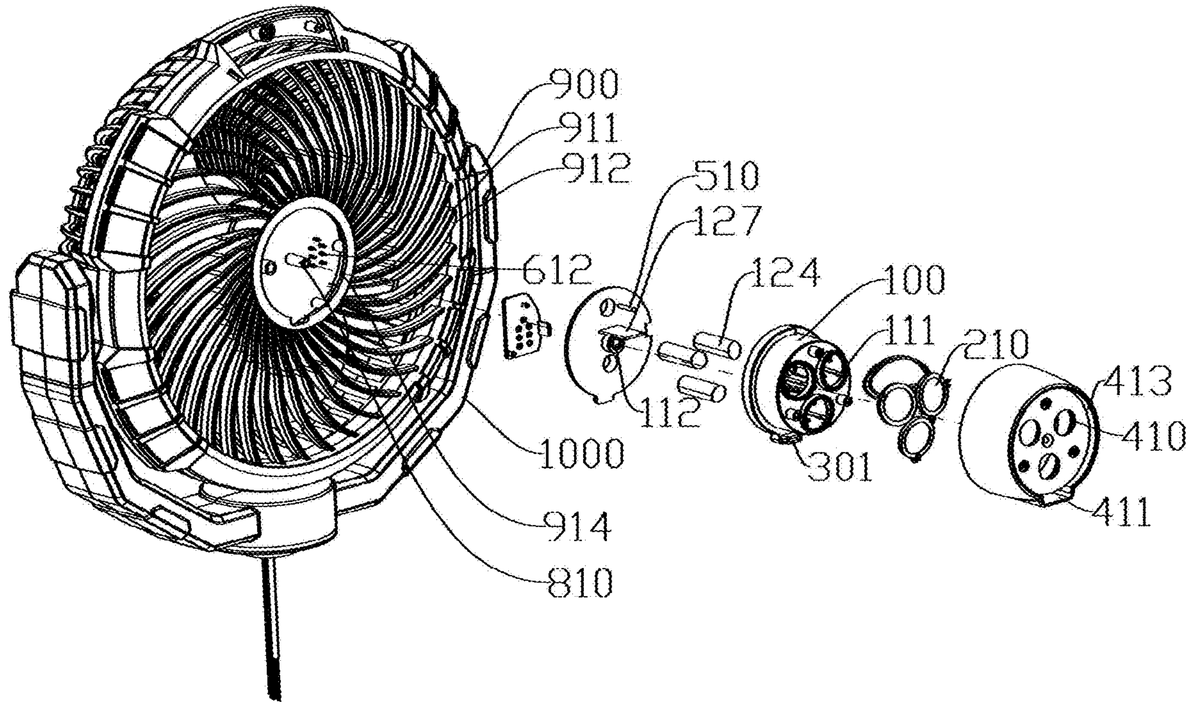
FIG. 10 is an exploded diagram of a spray device cooperating with a fan according to the present invention.
Figure 11:
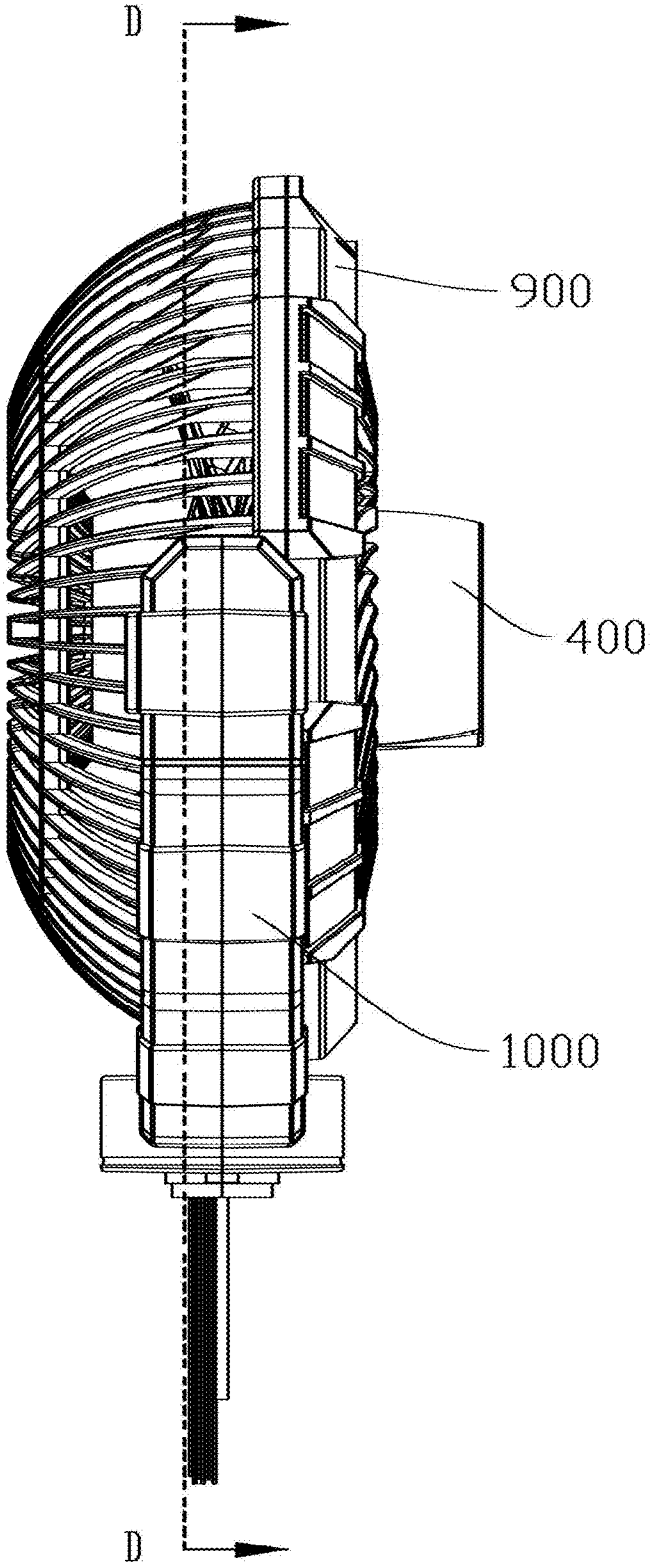
FIG. 11 is a side diagram of a spray device cooperating with a fan according to the present invention.
Figure 12:
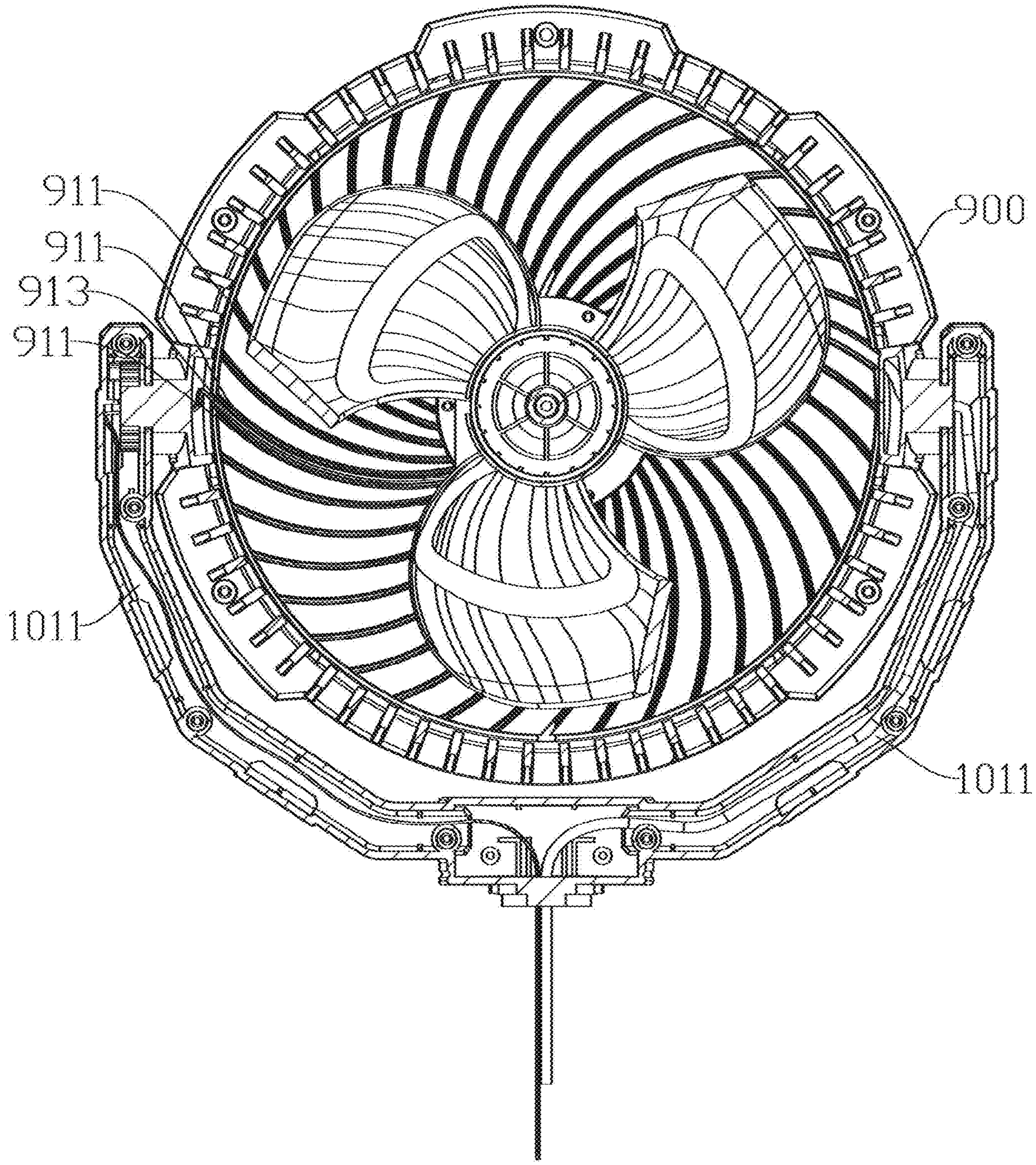
FIG. 12 is a schematic cross-sectional view along a D-D line of FIG. 11 according to the present invention.

Refer to FIG. 6 and FIG. 7. In some embodiments, an independent power supply main body is included. The spray device and the independent power supply main body are detachably connected to each other, to facilitate charging after the independent power supply main body and the spray device are separated. The independent power supply body includes an accommodation shell 1100, and a control circuit board 620, a water pump 820, and a power supply body 1200 are provided in the accommodation shell 1100. A charging port 1300 that can charge the power supply body 1200 is provided on the top of the accommodation shell 1100.

Refer to FIG. 8 to FIG. 12. In some embodiments, a fan is further provided, including a spray device and a fan body 900. A blowing surface of the fan body 900 is provided with a grille, and a mounting groove 914 is provided in the middle of the grille. A mounting plate 700 is provided in the mounting groove 914. A water injection guide member 800 includes a water injection insertion post 810, a water injection pipe 811, and a water pump for transporting water to the water storage chamber 110 via the water injection pipe 811. The water injection insertion post 810 is provided on the mounting plate 700 and one end can be inserted into the water injection hole 112. A sealing rubber sleeve is provided in the water injection hole, and the sealing rubber sleeve is configured to be in close contact with a hole wall of the water injection hole and an outer wall of the water injection insertion post 810, to prevent water in the water storage chamber from flowing out of the water injection hole. The other end is connected to the water injection pipe 811. Further, the mounting groove 914 is provided in the middle of the grille on the blowing surface of the fan body 900 and the mounting plate 700 is installed, so that the spray device is modularly fixed to the fan body 900. In addition, the water injection insertion post 810 in the water injection guide member 800 is installed on the mounting plate 700, and one end of the water injection insertion post can be inserted into the water injection hole 112 of the inner shell 100 and the other end is in communication with the water injection pipe 811. This can realize quick docking and assembly and disassembly of the spray device and the fan body 900, and ensure precise alignment and sealed connection of a water supply passage of the spray module. This structure allows the spray device to be disassembled, cleaned, maintained, and replaced as an independent unit, to reduce maintenance difficulty and time costs.

In this embodiment, the mounting plate 700 can be detachably connected to the mounting groove 914 through the cooperation of a hollow threaded post and/or a threaded hole and a screw.

In this embodiment, the grille is composed of a plurality of bars 911, any two adjacent bars 911 among the plurality of bars 911 are connected by a connection plate 912 and enclosed to form a guide limiting groove 913, and the guide limiting groove 913 is configured to guide and limit a guide wire and/or a water injection pipe 811. Further, two opposite inner sides of a U-shaped base 1000 are connected to two opposite outer sides of the fan body 900 in a damping rotation manner. A guide limiting channel 1011 is provided in the U-shaped base 1000 to connect the two opposite inner sides of the U-shaped base with the bottom of the U-shaped base 1000, and the guide limiting channel 1011 is configured to guide the guide wire and/or the water injection pipe 811 out of the fan body 900. Specifically, the grille is composed of the plurality of bars 911, the connection plate 912 is provided between any two adjacent bars 911, and the guide limiting groove 913 is formed. Two guide limiting grooves are provided, configured to embed and fix the wire and the water injection pipe 811 in the grooves, so that the wire and the water injection pipe do not shake, fall off or interfere with fan blades due to airflow impact or vibration when the fan is working. The guide limiting groove 913 can also play a role in positioning and protecting the wire and the water injection pipe 811. The guide limiting channel 1011 is provided in the U-shaped base 1000, passing through two inner sides and the bottom, and the grille is in communication with the guide limiting groove 913, so that the wire and/or water injection pipe 811 can be led out from the fan body 900 to the bottom of the base in an orderly manner, to prevent exposure and entanglement that affects the appearance and operation.

What is claimed is:

1. A spray device, comprising:

an inner shell (100), wherein the inner shell (100) is provided with a hollow water storage chamber (110), a first spray through hole (111) communicating with the water storage chamber (110) is provided on one side of the inner shell (100), a water injection hole (112) is provided on the other side of the inner shell (100), the water injection hole (112) connects the water storage chamber (110) with a water injection guide member (800), and the water injection guide member (800) is configured to inject water into the water storage chamber (110);

an atomization assembly, wherein the atomization assembly is embedded in the first spray through hole (111) and is configured to atomize liquid in the water storage chamber (110) and spray the liquid out of the water storage chamber (110);

a recirculation assembly (300), comprising a recirculation port (301) provided at the bottom of the inner shell (100) and a water return channel (302) for connecting the recirculation port (301) with the water storage chamber (110);

an outer shell (400), wherein the outer shell (400) is sleeved on an outer side of the inner shell (100), the outer shell (400) is provided with a second spray through hole (410) communicating with two opposite sides of the outer shell and facing the atomization assembly, a water collection tank (411) is provided at the bottom of the outer shell (400), and the recirculation port (301) is located in the water collection tank (411);

a sensing assembly, wherein the sensing assembly is provided in the water storage chamber (110) and is closer to a top wall of the water storage cavity than the atomizing assembly; and a control assembly, wherein the control assembly is connected to a signal of the sensing assembly and is configured to control the water injection guide member (800) to inject the water into the water storage chamber (110) and control the water injection guide member (800) to stop injecting the water into the water storage chamber (110) based on the signal of the sensing assembly.

2. The spray device according to claim 1, comprising a mounting plate (700), and the mounting plate (700) is detachably connected to the inner shell (100) via a detachable connection assembly.

3. The spray device according to claim 2, wherein the detachable connection assembly comprises a first magnetic member (711) provided on one side of the mounting plate (700) away from the inner shell (100) and a second magnetic member (712) that is provided on one side of the inner shell (100) close to the mounting plate (700) and that cooperates with the first magnetic member (711) for attachment.

4. The spray device according to claim 1, wherein the atomization assembly comprises three atomization sheets (210), the three atomization sheets are correspondingly provided between the first spray through hole (111) and the second spray through hole (410), a first circuit board (118) is provided on one side of the inner shell (100) away from the first spray through hole (111), and the atomization sheet (210) is electrically connected to the first circuit board (118).

5. The spray device according to claim 1, wherein a first box body (117) is provided on one side of the inner shell (100) away from the first spray through hole (111), a first circuit board (118) is provided in the first box body (117), a plurality of contacts (119) are provided on the first circuit board (118), and a plurality of first avoidance holes (120) facing the contacts (119) are provided on the first box body (117).

6. The spray device according to claim 5, wherein a second box body (610) is provided on one side of the mounting plate (700) close to the inner shell (100), a second circuit board (611) is provided in the second box body (610), a plurality of spring conductive contact pins (612) are provided on the second circuit board (611), a plurality of second avoidance holes (613) for the spring conductive contact pins (612) to pass through are provided on the mounting plate (700), and the spring conductive contact pins (612) can pass through the second avoidance holes (613) and the first avoidance holes (120) and then contact and conduct with the contacts (119).

7. The spray device according to claim 4, wherein a first positioning base (121), a second positioning base (122), and a third positioning base (123) are provided in the water storage chamber (110); a cylindrical sponge (124) is provided in each of the first positioning base (121), the second positioning base (122), and the third positioning base (123); one end of the cylindrical sponge (124) is closely attached to the atomization sheet (210); the first positioning base (121) and the second positioning base (122) are provided in a horizontal direction; and the third positioning base (123) is provided below the first positioning base (121) and the second positioning base (122).

8. The spray device according to claim 7, wherein the first positioning base (121), the second positioning base (122), and the third positioning base (123) each include at least three positioning plates (125), the positioning plates (125) are provided with a water guide opening (126) passing through opposite sides of the positioning base, a clamping positioning space is formed between the three positioning plates (125), and the cylindrical sponge (124) is clamped in the clamping positioning space.

9. The spray device according to claim 8, wherein a water guide protruding post (113) is provided in the water storage chamber (110), a water guide chamber (114) is provided in the water guide protruding post (113), one end of the water guide chamber (114) is in communication with the water injection hole (112), a water guide through groove (115) that is in communication with the water guide chamber (114) is provided on an outer side wall of the water guide protruding post (113), one side of the first positioning base (121), the second positioning base (122), or the third positioning base (123) close to the water guide protruding post (113) is connected to the water guide protruding post (113) through the positioning plate (125), a partition (127) is provided above the water guide protruding post (113), and the partition (127) is provided between the water guide protruding post (113) and the sensing assembly, to prevent the water ejected from the water guide protruding post (113) from directly contacting the sensing assembly.

10. The spray device according to claim 9, wherein the water injection guide member (800) comprises a water injection insertion post (810), a water injection pipe (811) and a water pump for transporting the water to the water storage chamber (110) via the water injection pipe (811), the water injection insertion post (810) is provided on the mounting plate (700), and one end of the water injection insertion post can be inserted into the water injection hole (112) and the other end is in communication with the water injection pipe (811).

11. The spray device according to claim 1, wherein the water return channel (302) extends from the bottom of the inner shell (100) along a side wall of the inner shell (100) to the top of the inner shell (100).

12. The spray device according to claim 1, wherein an annular guide portion (413) is protruded from one end of the outer shell (400) away from the inner shell (100), the water collection tank (411) is in communication with the guide portion, and a connection hole for inserting the recirculation port (301) into the water collection tank (411) is provided on one end of the water collection tank (411).

13. The spray device according to claim 1, wherein the sensing assembly is a sensing probe (510), and the sensing probe (510) is configured to sense a voltage change in the water storage chamber; and when the water in the water storage chamber is in contact with the sensing probe (510), the control assembly controls a water pump to stop running after detecting the voltage change of the sensing probe.

14. The spray device according to claim 1, wherein a time control module is integrated on the control assembly, the time control module starts timing when the water pump stops running, and sends a signal to the control assembly when the water pump stops running for forty-five to fifty-five seconds, and the control assembly controls the water pump to start running.

15. The spray device according to claim 1, wherein a plurality of first threaded connection posts (116) are provided on one side of the inner shell (100), a plurality of first connection through holes (414) corresponding to the first connection posts are provided on one side of the outer shell (400), the first connection posts and the first spray through holes (111) are located on the same side of the inner shell (100), and can be connected to the first threaded connection posts (116) after passing through the first connection through holes (414) by using screws.

16. A fan, comprising the spray device according to claim 1 and a fan body (900), wherein a blowing surface of the fan body (900) is provided with a grille, a mounting groove (914) is provided in the middle of the grille, and a mounting plate (700) is provided in the mounting groove (914).

17. The fan according to claim 16, wherein the mounting plate (700) can be detachably connected to the mounting groove (914) through the cooperation of a hollow threaded post and/or a threaded hole and a screw.

18. The fan according to claim 16, wherein the grille is composed of a plurality of bars (911), any two adjacent bars (911) among the plurality of bars (911) are connected by a connection plate (912) and enclosed to form a guide limiting groove (913), and the guide limiting groove (913) is configured to guide a guide wire and/or a water injection pipe (811).

19. The fan according to claim 16, comprising a U-shaped base (1000), wherein two opposite inner sides of the U-shaped base (1000) are connected to two opposite outer sides of the fan body (900) in a damping rotation manner.

20. The fan according to claim 19, wherein a guide limiting channel (1011) is provided in the U-shaped base (1000) to connect the two opposite inner sides of the U-shaped base with the bottom of the U-shaped base (1000), and the guide limiting channel (1011) is configured to guide a guide wire and/or a water injection pipe (811) out of the fan body (900).

* * * * *